(12) United States Patent
Tanaka

(10) Patent No.: US 6,281,294 B1
(45) Date of Patent: Aug. 28, 2001

(54) GOLF BALL

(75) Inventor: Hiroaki Tanaka, Kobe (JP)

(73) Assignee: Sumitomo Rubber Industries Limited, Hyogo-ken (JP)

(*) Notice: Subject to any disclaimer, the term of this patent is extended or adjusted under 35 U.S.C. 154(b) by 0 days.

(21) Appl. No.: 09/471,394

(22) Filed: Dec. 23, 1999

(30) Foreign Application Priority Data

Dec. 25, 1998 (JP) ................................................ 10-370914

(51) Int. Cl.[7] ........................... A63B 37/06; A63B 37/02; C08L 9/00
(52) U.S. Cl. .......................... 525/274; 525/305; 473/371; 473/372; 473/377
(58) Field of Search ................................. 525/274, 305; 473/371, 372, 377

(56) References Cited

U.S. PATENT DOCUMENTS 4,056,269 * 11/1977 Pollitt .

FOREIGN PATENT DOCUMENTS 2335366   9/1999 (GB) .

\* cited by examiner

*Primary Examiner*—David J. Buttner

(57) ABSTRACT

The present invention provide a golf ball which can improve the mold releasing property in a press molding to ensure an increased productivity without decreasing a flight performance and durability.

The golf ball has a part including a vulcanized rubber composition. The vulcanized rubber composition includes 100 parts by weight of a base rubber and 100 parts by weight or less of unsaturated carboxylic acid compounds. The unsaturated carboxylic acid compounds includes Component (A) of magnesium (meth) acrylate, and Component (B) of $\alpha$, $\beta$-unsaturated carboxylic alkyl ester. The content ratio of the Component (A) to the Component (B) (A/B) is 0.2 to 4.

12 Claims, No Drawings

GOLF BALL

This application is based on patent application No. 10-370914 filed in Japan, the contents of which are hereby incorporated by references.

FIELD OF THE INVENTION

The present invention relates to a golf ball having an increased productivity by improving a mold releasing property of a rubber composition in a press molding without decreasing a flight performance, shot feeling and durability thereof.

BACKGROUND OF THE INVENTION

Generally, a core for a solid golf ball is made from a rubber composition. It is known that the conventional rubber composition includes a base rubber, a zinc salt of acrylic acid or methacrylic acid as a co-crosslinking agent of the base rubber, and organic peroxide as a crosslinking initiator.

The solid core made from such a rubber composition has an excellent resilience and flight performance. However, the rubber composition including zinc (meth)acrylate (i.e., zinc acrylate or zinc methacrylate) is not easily released from a metal mold. Accordingly, it is difficult to improve the productivity of the golf ball. The poor mold releasing property may be improved by mixing a fluorine-type or silicon-type releasing agent with the rubber composition. Alternatively, a surface treatment such as chrome plating and fluororesin coating is applied to the mold surface to improve the releasing operation between the mold surface and the rubber composition.

However, in the case that the rubber composition contains such a releasing agent, the vulcanization of the rubber composition may be softer as the content of the releasing agent increases. To compensate for the problem, it is necessary to add a curing agent to the rubber composition. As a result, the content of the base rubber to the rubber composition decreases, causing a poor durability of the obtained rubber.

On the other hand, in the case that the mold surface is treated to improve the releasing operation, the rubber composition does not have the above-mentioned problem about the former case, since the rubber composition itself is not affected by such a surface treatment. However, if a releasing agent which is liable to adhere is used for the surface treatment, a further washing step is needed to remove the adhered releasing agent from the inner surface of the mold before a following step. The additional washing step hinders the improvement of productivity of golf ball. On the other hand, if a releasing agent which is unlikely to adhere is used for the surface treatment, the washing step is not necessary. Such a releasing agent, however, is expensive, thereby raising the production costs of golf ball.

In addition, instead of using the releasing agent, magnesium (meth)acrylate having a better mold releasing property than zinc (meth)acrylate may be used as a co-crosslinking agent. However, the rubber composition containing magnesium (meth)acrylate provides less resilience and thereby worse flight performance to the obtained golf ball than that containing zinc (meth)acrylate.

SUMMARY OF THE INVENTION

An object of the present invention is to provide a golf ball which can improve the mold releasing property in a press molding to ensure an increased productivity without decreasing a flight performance, shot feeling and durability thereof.

According to an aspect of the present invention, a golf ball has a part including a vulcanized rubber composition. The vulcanized rubber composition includes 100 parts by weight of a base rubber and 100 parts by weight or less of unsaturated carboxylic acid compounds. The unsaturated carboxylic acid compounds includes magnesium (meth) acrylate (Component (A)) and $\alpha$, $\beta$-unsaturated carboxylic alkyl ester (Component (B)). The content ratio of the Component (A) to the Component (B) (A/B) is 0.2 to 4.

According to another aspect of the present invention, a golf ball has a part including a vulcanized rubber composition. The vulcanized rubber composition includes 100 parts by weight of a base rubber, 10 to 60 parts by weight of magnesium (meth)acrylate (Component (A)) and 10 to 60 parts by weight of $\alpha$, $\beta$-unsaturated carboxylic alkyl ester (Component (B)). The total content of the Component (A) and Component (B) (Component (A)+Component (B)) is 100 parts by weight or less, and the content ratio of the Component (A) to the Component (B) (A/B) is 0.2 to 4.

DETAILED DESCRIPTION OF THE PREFERRED EMBODIMENTS OF THE INVENTION

A golf ball according to the present invention has a part, i.e., a layer, made by vulcanizing a rubber composition. The rubber composition has a base rubber and unsaturated carboxylic acid compounds including magnesium salt of acrylic or methacrylic acid (hereinafter, referred to as "(meth) acrylic acid") and $\alpha$, $\beta$-unsaturated carboxylic alkyl ester.

As the base rubber, any diene rubber having a diene component in a molecule may be used. Specifically, butadiene rubber (BR), ethylene-propylene-diene terpolymer (EPDM), isoprene rubber (IR), styrene-butadiene rubber (SBR) and acrylonitrile-butadiene rubber (NBR) can be used solely or in a combination of two or more kinds. Of these, rubbers having butadiene as a main component are preferably used. Specifically, 50 wt % or more of butadiene rubber is included in the base rubber in the rubber composition. As the butadiene rubber, cis-1,4-polybutadiene rubber having 90% or more of cis-bonds may be preferably used. This is because the cis-1,4-polybutadiene rubber can provide an excellent resilience to the golf ball. The unsaturated carboxylic acid compounds may include, if necessary, other unsaturated carboxylic acids compounds than magnesium (meth)acrylate and $\alpha$, $\beta$-unsaturated carboxylic alkyl ester.

In the present invention, magnesium (meth)acrylate (hereinafter, referred to as "Component A") is added to the rubber composition as a co-crosslinking agent. The magnesium salt has the highest releasing property among any metal salt of $\alpha$, $\beta$-unsaturated carboxylic acid which is generally used as a co-crosslinking agent.

The preferable content of magnesium (meth)acrylate is 10 to 60 parts by weight, preferably 15 to 60 parts by weight, per 100 parts by weight of the base rubber. In the case that the content is less than 10 parts by weight, the obtained rubber has an unsatisfactory low hardness due to the low crosslinking density in the core. Thus, the resilience of the golf ball at a shot is likely to decrease, resulting in a decreased flying distance. On the other hand, in the case that the content of co-crosslinking agent is more than 60 parts by weight, the obtained core is likely to have an excessively high hardness due to the high crosslinking density in the core. Thus, the impact by a shot against the golfer may increase, resulting in a poor shot feeling.

As described above, the rubber composition according to the present invention includes $\alpha$, $\beta$-unsaturated carboxylic alkyl ester (hereinafter, referred to as "Component B"). The Component B is an ester obtained as a reaction product between (meth)acrylic acid and fatty alcohol. Preferable Component B has a melting point of 100° C. or less. This is because of the fact that, since the mixing of the rubber composition is generally performed with heat at 120° C. or more, Component B having such a low melting point can melt during the mixing to show an improved dispersibility. As examples of the fatty alcohol, there may be any of linear alkyl alcohols and non-linear alkyl alcohols having branches, and any of monohydric alcohols having a hydroxyl group per a molecule and polyhydric alcohols having two or more hydroxyl groups per a molecule, as far as the alcohols are capable of making an ester. Preferably used may be linear alkyl alcohols having 1 to 3 hydroxyl groups per a molecule. This is because the preferable alcohols provide a small stereostructure to the resulting α, β-unsaturated carboxylic alkyl ester in order that the resulting ester facilitates crosslinking reaction with diene rubber or unsaturated carboxylic acid and also shows an excellent dispersibility to the rubber composition to thereby give a satisfactory resilience to the obtained rubber. Examples of the preferable α, β-unsaturated carboxylic alkyl ester, i.e., Component B, includes esters of monohydric alcohol such as methyl (meth)acrylate, ethyl (meth)acrylate and lauryl (meth)acrylate; esters of dihydric alcohol such as ethylene glycol di(meth)acrylate; esters of trihydric alcohol such as trimethylol propane tri(meth)acrylate. These can be used solely or in a combination of two or more kinds. The method for preparing the ester may use any reaction to obtain the above ester as a reaction product, which includes but not limited to esterification between an α, β-unsaturated carboxylic acid and a desired fatty alcohol.

The reasons because the rubber composition include the α, β-unsaturated carboxylic alkyl ester (i.e., Component B) as an essential component are explained as follows. The α, β-unsaturated carboxylic alkyl ester (i.e., Component B) is capable of co-crosslinking with the magnesium salt (i.e., Component A), to improve network structure of the base rubber and Component A. The improved structure can increase the resilience of the obtained vulcanized rubber. In addition, since Component B has double bonds and can act as a co-crosslinking agent, that is, Component B can be incorporated in the co-crosslinking structure with the base rubber as described above, it is unlikely to bloom or bleed from the obtained vulcanized rubber. Furthermore, Component B as a co-crosslinking agent can contribute to improving the hardness of the obtained vulcanized rubber. Therefore, excessively large deformation of the vulcanized rubber at a shot is prevented, resulting in a decreased energy loss at a shot.

Although a plasticizer such as aromatic carboxylic ester (e.g., phthalic ester) and saturated aliphatic carboxylic ester (e.g., adipic ester) is a carboxylic ester and seems to be used instead of or in addition to the above ester, the plasticizer is likely to cause blooming or bleeding problem if it is contained in the rubber composition. This is because, since such a plasticizer is not capable of bonding with (i.e., closslinking with) the base rubber or Component A of magnesium (meth)acrylate by the vulcanization, it is easy to bloom or bleed from the vulcanized rubber and migrate into the cover or the like, thereby decreasing the cover strength, the durability of the ball, the resilience of the ball and the like.

The content of the α, β-unsaturated carboxylic alkyl ester is preferably 10 to 60 parts by weight per 100 parts by weight of the base rubber. When the content of the ester is less than 10 parts by weight, such a small content of the ester is not sufficient to improve the molecular structure made of the base rubber and magnesium (meth)acrylate. On the contrary, when the ester is added more than 60 parts by weight in order to satisfy a predetermined ratio of magnesium (meth)acrylate to the ester, it is unavoidable that the total weight of unsaturated carboxylic acid compounds is excessively large. This hinders improvement of the molecular structure made of the base rubber and magnesium (meth)acrylate, thereby making it impossible to increase resilience of the resulting rubber, resulting in a poor shot feeling of the obtained golf ball.

The predetermined ratio of magnesium (meth)acrylate (Component A) to α, β-unsaturated carboxylic alkyl ester (Component B) [A/B] is 0.2 to 4, preferably 1 to 4. The ratio of A/B less than 0.2 is likely to decrease the resilience of the obtained rubber due to an excessively small content of Component A, resulting in a poor shot feeling. On the other hand, the ratio of A/B more than 4 may not improve the molecular structure made of the base rubber and Component A due to an excessively small content of Component B. Therefore, the resilience of the obtained rubber may not sufficiently increase.

The other unsaturated carboxylic compounds contained in the unsaturated carboxylic acid compounds than Components A and B may include unsaturated carboxylic acids and metal salts thereof, which can act as a co-crosslinking agent. The total weight of the α, β-unsaturated carboxylic acid compounds including Components A and B and the other compounds is preferably 120 parts by weight or less, more preferably 110 parts by weight or less, further preferably 100 parts by weight or less, and most preferably 50 parts by weight or less, per 100 parts by weight of the base rubber. This make it possible to provide a desired crosslinking density to the rubber, resulting in a good shot feeling of the obtained golf ball. However, the α, β-unsaturated carboxylic acid compounds to be mixed with the base rubber as a co-crosslinking agent is preferably limited to such an extent that the total weight of Components A and B is within the above preferable range.

The rubber composition may further include a co-crosslinking initiator in addition to the above essential components (i.e., a base rubber, magnesium (meth)acrylate, and α, β-unsaturated carboxylic alkyl ester). Examples of the co-crosslinking initiator may include organic peroxide such as dicumyl peroxide, 1,1-bis(t-butyl peroxy)-3,5-trimethyl cyclohexane, 2,5-dimethyl-2,5-di(t-butyl peroxy) hexane and di-t-buthyl peroxide. The content of the organic peroxide is preferably 0.1 to 3, more preferably 0.3 to 2.5 parts by weight, per 100 parts by weight of the diene rubber (i.e., the base rubber).

Furthermore, if necessary, the rubber composition can include additives which are generally contained in a golf ball. The additives may include a specific gravity filler such as zinc oxide, barium sulfate and calcium carbonate; a metal powder having high specific gravity such as tungsten and molybdenum powder; an antioxidant; and a peptizer. When an antioxidant is added to the rubber composition, the content of the antioxidant is preferably 0.2 to 0.5 parts by weight per 100 parts by weight of the diene (i.e., base) rubber.

The rubber composition preferably does not include a plasticizer. This is because: (1) although the rubber composition does not contain such plasticizer as phthalic ester and adipic ester, the α, β-unsaturated carboxylic alkyl ester contained in the rubber composition can decrease the viscosity of the composition to the same extent as the plasticizer; and (2) if the rubber composition has a plasticizer, there may be such a problem as bleeding. For example, when the plasticizer migrates into the ionomeric cover on the core, the ionomeric cover is likely to have a decreased strength and stiffness, thereby decreasing the durability and resilience of the golf ball.

A golf ball used in the present invention may be any golf ball having a rubber layer formed from the vulcanized rubber composition. Examples of the golf ball include one-piece golf ball which is defined by a single main body made from the vulcanized rubber composition; two-piece golf ball whose main body has a core and a cover, the core being made from the vulcanized rubber composition; and multi-piece golf ball whose main body has a multi-layered core and a cover, the core having at least one layer made from the vulcanized rubber composition. To produce the golf ball, the vulcanized rubber composition may be used for a layer of the golf ball, which is preferably formed by press molding, injection molding or injection transfer molding, but not limited thereto.

To form the layer from the vulcanized rubber composition, any method can be applied such as press molding and injection molding which uses a dynamic crosslinking. In the case of press molding, since the rubber composition according to the present invention is excellent in mold releasing property, after the rubber composition is compressed, there will not occur the releasing problems that a part of the rubber composition is adhered to the inner surface of the mold and the rubber composition cannot be removed from the mold. On the other hand, in the case of injection molding, since the rubber composition has such a low viscosity as to decrease the amount of internal heat to be generated by shear stress in the composition, there may not be such a problem as scorching that the composition is vulcanized during the injection.

EXAMPLES

[Methods of Measurement and Evaluation]

① Flying Distance (Carry)

A W#1 driver was mounted to a swing robot manufactured by True Temper Co., Ltd. and the golf ball was hit by the driver at a head speed of 45 m/sec. Then, the flying distance (i.e., carry), which is the distance from the point where the ball was hit to the point where the ball fell to the ground, was measured.

② Shot Feeling

Each of ten professional golfers hit a golf ball using a W#1 driver, and evaluated the shot feeling of the ball based on the number of golfers who answered the shot feeling was "GOOD", under the following criteria. The shot feeling meant the total feeling which the golfer received at a shot including feeling of the impact and resilience, feeling of the fitness of the club face to the ball surface, feeling of the lightness, and the like.

○: 8 to 10 golfers answered "GOOD";
Δ: 4 to 7 golfers answered "GOOD"; and
X: 0 to 3 golfers answered "GOOD".

③ Mold Releasing Property

A core was formed by press molding and then the mold releasing property of the core was evaluated under the following criteria.

○: The formed core could be removed from the mold easily by hand, even the mold had no releasing agent on its surface;

Δ: The formed core could be removed from the mold by hand, when the mold had a fluorine releasing agent on its surface; and X: The formed core could not be removed, even the mold had a fluorine releasing agent on its surface.

④ Durability

A golf ball was repeatedly hit to a metal plate at a rate of 45 m/sec by using an airgun until the golf ball had a crack. The ball was evaluated to have higher durability as the number of the hitting times increased.

[Production of Core]

Respective rubber compositions for cores of golf ball Nos. 1 to 10 were prepared as shown in Table 1. Each composition was compressed and vulcanized for 20 minutes at a mold temperature of 155° C. to form a core having a diameter of 38.4 mm. Then, 50 parts by weight of Himilan® 1605 (manufactured by Mitui DuPont Chemical Co.,Ltd.), 50 parts by weight of Himilan® 1706 (manufactured by Mitui DuPont Chemical Co.,Ltd.) and 2 parts by weight of titanium oxide were mixed in an extruder. The mixture was injected on the core to form a cover enclosing the core. As a result, golf ball Nos. 1 to 10 were obtained. Of the golf balls shown in Table 1, golf ball Nos. 1 to 5 had a core made from the rubber composition according to the present invention, i.e., having specific contents of magnesium (meth)acrylate and trimethylol propane trimethacrylate. The other golf balls (Nos. 6 to 10) were comparative examples of the present invention. The above described evaluations were made to the obtained golf balls. The results were shown in Table 1.

The butadiene rubber shown in Table 1 was "BR01" (cis-1,4-polybutadiene rubber having 96 % of cis-1,4-bond; manufactured by JSR Co., Ltd). The trimethylol propane trimethacrylate also shown in Table 1 was "Sunester TMP" (manufactured by Sanshin Chemical industry Corp.) The unit of the contents of respective components in the rubber composition shown in Table 1 were "parts by weight".

TABLE 1

| | No. | 1 | 2 | 3 | 4 | 5 | 6 | 7 | 8 | 9 | 10 |
|---|---|---|---|---|---|---|---|---|---|---|---|
| Content (parts by weight) | Butadiene rubber | 100 | 100 | 100 | 100 | 100 | 100 | 100 | 100 | 100 | 100 |
| | Magnesium methacrylate (A) | 15 | 55 | 35 | 20 | 10 | 7 | 65 | — | 40 | 6 |
| | Trimethylolpropane methacrylate (B) | 15 | 55 | 10 | 20 | 35 | 7 | 65 | — | 6 | 40 |
| | Magnesium oxide | 23 | 23 | 23 | 23 | 23 | 23 | 23 | — | 23 | 23 |
| | Zinc acrylate | — | — | — | — | — | — | — | 50 | — | — |
| | Zinc oxide | — | — | — | — | — | — | — | 15 | — | — |
| | Dicumyl peroxide | 2 | 2 | 2 | 2 | 2 | 2 | 2 | 1.5 | 2 | 2 |
| | Total weight of unsaturated Carboxylic acid compounds | 30 | 110 | 45 | 40 | 45 | 14 | 130 | 50 | 46 | 46 |
| | Content ratio of A/D | 1 | 1 | 3.5 | 1 | 0.4 | 1 | 1 | — | 6.7 | 0.15 |
| Evaluation | Shot feeling | ○ | Δ | ○ | ○ | ○ | Δ | X | Δ | Δ | Δ |
| | Releasing property | ○ | ○ | ○ | ○ | ○ | ○ | ○ | X | ○ | ○ |

TABLE 1-continued

| No. | 1 | 2 | 3 | 4 | 5 | 6 | 7 | 8 | 9 | 10 |
|---|---|---|---|---|---|---|---|---|---|---|
| Carry (yard) | 230 | 229 | 230 | 229 | 228 | 210 | 231 | 232 | 215 | 222 |
| Durability (number of times) | 150 | 230 | 150 | 180 | 150 | 100 | 260 | 200 | 250 | 250 |

Comparing the results of golf ball Nos. 3, 5 and 8 having almost same total weight of unsaturated carboxylic acid compounds, it was found that the rubber composition having zinc acrylate (No. 8) provided a worse mold releasing property to the obtained rubber than that having magnesium methacrylate, i.e., Component A (Nos. 3 and 5).

Golf balls Nos. 9 and 10 had 46 parts by weight of unsaturated carboxylic acid compounds consisting of Components A and B. However, both of the content ratios of Component A to Component B were without a specific range of 0.2 to 4, because the content of Component A is less than 10 parts by weight and the ratio of Component A to Component B is less than 0.2 (No.10), or the content of Component B is less than 10 parts by weight and the ratio of Component A to Component B is more than 0.2 (No.9). From the results of them, it was found that such a content ratio of Component A to Component B caused a poor shot feeling and a decreased carry to the obtained golf ball.

Golf balls Nos. 6 and 7 had a content ratio of Component A to Component B of 0.2 to 4, but the total weight of unsaturated carboxylic acid compounds were excessively small (No. 6) or excessively large (No. 7). In the case that the total weight of unsaturated carboxylic acid compounds was excessively small (No. 6), the golf ball had a low durability and a decreased carry due to its poor resilience. In addition, although the golf ball was soft to decrease the impact the golfer received at a shot, the golfer had a poor shot feeling. This is because the golfer felt like he hit a coreless ball due to the poor resilience of the ball. Also, he felt a heavy feeling at a shot, since the ball was kept longer in contact with the club head due to a large deformation of the ball. On the contrary, in the case that the total weight of unsaturated carboxylic acid compounds was excessively large (No. 7), the golf ball also had a bad shot feeling due to the excessively high crosslinking density of the core.

Golf ball No. 2 had more than 100 parts by weight of the total weight of Components A and B. From the result of the golf ball, it was found that such a large amount of unsaturated carboxylic acid compounds affected the shot feeling of the ball.

As described above, a golf ball according to the present invention has a core made from a rubber composition containing unsaturated carboxylic acid compounds which can provide a high mold releasing property and resilience to the core. Thus, the golf ball can be excellent in mold releasing property, while maintaining the flight performance and shot feeling.

Therefore, according to the present invention, a golf ball having an excellent flight performance and shot feeling can be produced efficiently.

What is claimed is:

1. A Golf ball having a part including a vulcanized rubber composition, the vulcanized rubber composition comprising:
   100 parts by weight of a base rubber; and
   100 parts by weight or less of unsaturated carboxylic acid compounds, the unsaturated carboxylic acid compounds including
      Component (A): magnesium (meth)acrylate, and
      Component (B): α, β-unsaturated carboxylic alkyl ester,
   wherein the content ratio of the Component (A) to the Component (B) (A/B) is 0.2 to 4.

2. A golf ball according to claim 1, wherein the content of the Component (A) is 10 to 60 parts by weight.

3. A golf ball according to claim 1, wherein the content of the Component (B) is 10 to 60 parts by weight.

4. A golf ball according to claim 1, wherein the unsaturated carboxylic acid compounds essentially consist of the Components (A) and (B).

5. A golf ball according to claim 1, wherein the Component (B) is a (meth)acrylic ester.

6. A golf ball according to claim 5, wherein the (meth) acrylic ester is a trimethylol propane tri(meth)acrylate.

7. A golf ball according to claim 1, wherein the base rubber comprises a butadiene having 90% or more of cis-1,4-bonds.

8. A golf ball according to claim 1, wherein the vulcanized rubber composition excludes a plasticizer.

9. A golf ball according to claim 1, wherein the part constitutes a core of the golf ball.

10. A Golf ball having a part including a vulcanized rubber composition, the vulcanized rubber composition comprising:
   100 parts by weight of a base rubber;
   Component (A): 10 to 60 parts by weight of magnesium (meth)acrylate; and
   Component (B): 10 to 60 parts by weight of α, β-unsaturated carboxylic alkyl ester,
   wherein the total content of the Component (A) and Component (B) (Component (A)+Component (B)) is 100 parts by weight or less, and the content ratio of the Component (A) to the Component (B) (A/B) is 0.2 to 4.

11. A golf ball according to claim 9, wherein the vulcanized rubber composition excludes a plasticizer.

12. A golf ball according to claim 1, wherein the part constitutes a core of the golf ball.

* * * * *